Patented May 5, 1942

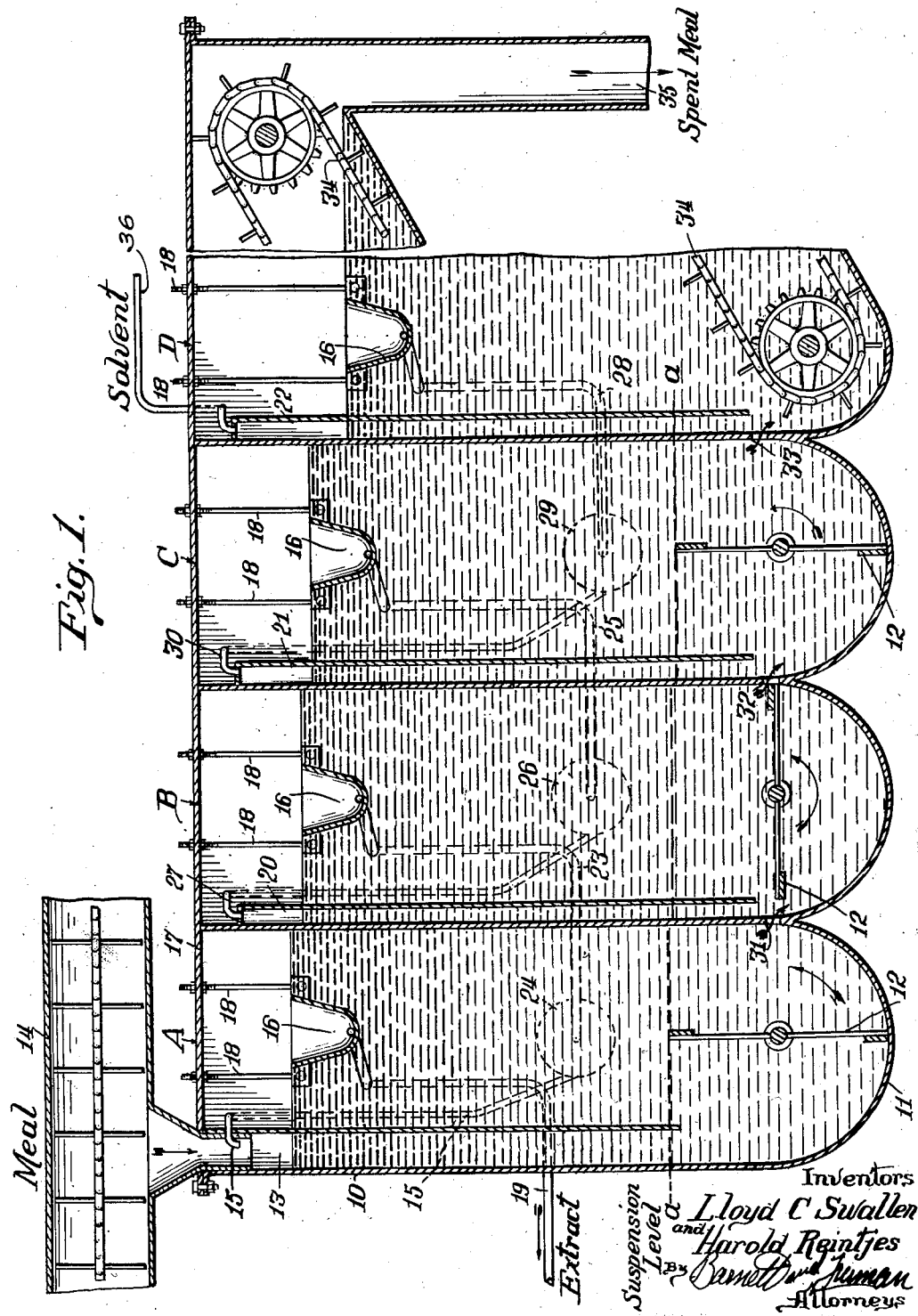

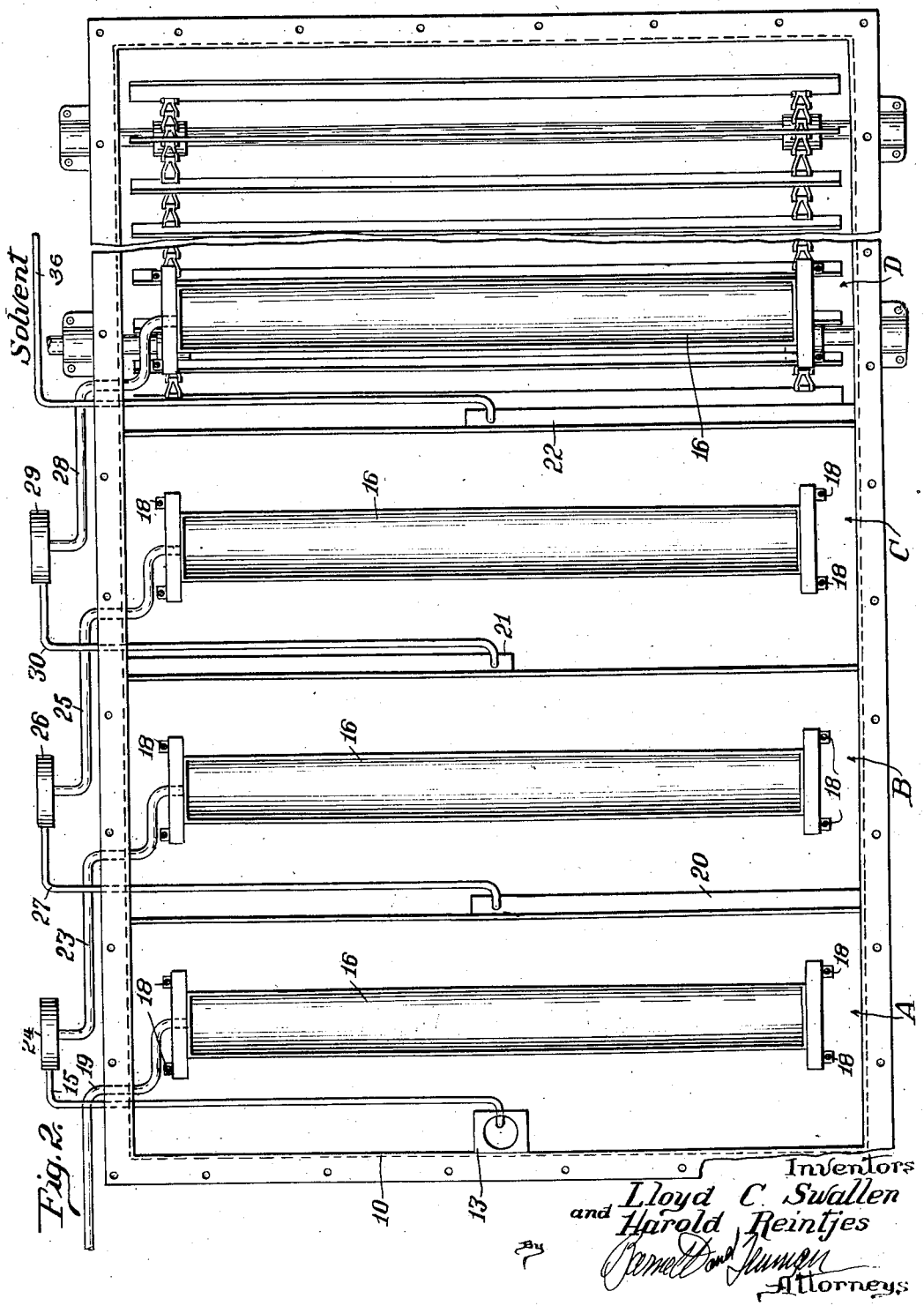

2,282,265

UNITED STATES PATENT OFFICE 2,282,265

EXTRACTION APPARATUS AND METHOD

Lloyd C. Swallen, Argo, and Harold Reintjes, Berwyn, Ill., assignors to Corn Products Refining Company, New York, N. Y., a corporation of New Jersey Application August 17, 1939, Serial No. 290,606

3 Claims. (Cl. 23—310)

This invention relates to the extraction of soluble substances from solids; and its principal object is to provide a continuous process, and continuously operating apparatus for extracting solubles from granular solids, for example for the extraction of zein from corn (maize) gluten meal; although the invention is not limited to this particular material but is applicable to any granular or mealy material which is capable of forming with the solution a thick suspension having no great tendency to clog orifices, and which material is solid and relatively dense so that it will be capable of settling readily in the solution.

A further object of the invention is to provide an extraction apparatus which will be simple and economical in respect to its construction and operation; which will be capable of being conveniently regulated to produce a clear solution containing a maximum quantity of solubles; and which can be easily kept clean.

The process of extraction provided by this invention is carried out in an apparatus consisting of a series of units through which series the meal is moved in one direction and the solution in the other. The meal and solution in the form of a relatively thick mixture or suspension is agitated in the bottom portion of each unit but slowly enough so that settling of solids from the settling zone into the agitation or mixing zone is permitted; whereby clear solution overflows from the settling zones. The mixing zone and the settling zone, of each unit, are rather definitely divided, and the thick mixture or suspension from the mixing zone of one unit moves to the mixing zone of the next unit, through connections which are below the upper levels of the mixing zones, and so on throughout the series of units, which may be multiplied in number to any desired extent. The solution, of zein in alcohol, for example, (the fresh solvent being introduced into the last of the units) overflows or is otherwise removed, from the upper portion of each unit, as clear solution, and is introduced into the agitation zone of the next unit in advance in the series, countercurrent, therefore, to the movement of the solids.

Control to insure the discharge of the final solution, substantially free from solids and containing the required content of solubles, is effected by employing a larger or a smaller number of units, by regulating the quantity of feed into the first unit, and, if necesary, by adjusting the levels of the overflows from the units individually.

The invention is illustrated in the accompanying drawings wherein

Fig. 1 is a longitudinal sectional view of a preferred form of the apparatus with certain parts broken away and with the pumps for transferring the solution from unit to unit shown in dotted lines, indicating their position back of the extraction tanks; and Fig. 2 is a fragmentary plan view of the apparatus shown in Fig. 1.

The apparatus consists of a plurality of extraction units, the drawings showing four, designated A, B, C and D, respectively, the latter unit being the end unit, shown fragmentarily, from which the spent material is withdrawn and into which the fresh solvent is introduced.

The unit A consists of a tank 10; the bottom of which is preferably semi-cylindrical as shown at 11; and in this portion of the tank is located a rotary agitator 12 which turns in the direction indicated by the arrow (Fig. 1). The level of the suspension, or upper limit of the agitation zones in the units A, B, and C is indicated by the dotted line a—a; the operation of the apparatus being regulated so that there is very little agitation above this level, whereby a quiescent settling zone is provided in which clarification of the solution takes place by the subsidence of solids through this settling zone and into the agitation zone. Tank 10 of unit A is provided with a down-spout 13 (Fig. 2) into which the fresh meal is fed by a conveyor 14. Solution from unit B is introduced into the down-spout 13 through pipe 15, as will be hereinafter described. The down-spout 13 preferably extends into, or at least comes close to, the mixing zone of the unit.

Any suitable means is used for withdrawing the clear liquor from the unit A, this clear liquor being the finished extract. In the drawings there is shown for this purpose an overflow vessel 16 adjustably secured to the top member 17 of the apparatus (which forms a cover for all of the tanks) by means of hangers 18. In this way the level at which the solution is discharged from the unit A may be varied for the purpose of control. The finished solution or extract is discharged from the overflow vessel 16 through pipe 19.

The units B and C are constructed substantially like unit A (and corresponding parts are given the same designating numerals) except that the pipe connections are different and the down-spouts 20, 21 of units B and C are narrower than the down-spout 13, as they are intended only for solution and not for solid material. The down-spouts 20 and 21, and the down-spout 22 of unit D, to be described, are preferably transversely elongated but not to as great an extent as the transverse dimensions of the respective tanks and are in staggered arrangement as shown in Fig. 2.

The adjustable overflow vessel 16 of unit B is connected by pipe 23 to a pump 24, from which pump extends the pipe 15, above referred to, which leads into the down-spout 13 of the unit A.

The adjustable overflow vessel 16 of unit C is connected by pipe 25 to pump 26, the eduction pipe 27 of which leads to the down-spout 20 of unit B. Similarly the adjustable overflow vessel 16, which is located in the unit D, discharges through pipe 28 to a pump 29, the eduction pipe 30 of which leads to the down-spout 21. The down-spouts 20 and 21 are preferably carried down as far into the agitation zones as possible so as to insure proper mixing of the solution with the thick mixtures in the bottom zones of the units. The bottom portion 11 of unit A is formed with an opening 31, considerably below the level of the suspension $a$—$a$ through which the thick mixture in the unit A passes into the agitation zone of unit B. There are similar openings 32 and 33 between units B and C and C and D, respectively. The spent meal is removed from unit D by the endless drag chain 34 which discharges the material into a down-spout 35. The fresh solvent enters the down-spout 22, of unit D, through pipe 36.

It will be observed that the operation of the apparatus may be controlled by the rate at which the meal is fed into unit A, and the rate at which the fresh solvent is delivered to the last unit D. These controls are such that the solubles may be as fully extracted from the material treated as may be desired, and the extract discharged from the apparatus clarified to the extent desired. Further control is effected, for each unit individually, by the vertical adjustment of overflow vessels 16. The agitators 12 are rotated rapidly enough to properly mix the solution with the meal so as to insure efficient extraction, but the movement of the agitators is controlled so that there will be, in each unit, above the agitation zone, a quiescent or settling zone through which solids may subside into the agitation zone, whereby a relatively clear liquor, substantially free from solids, is drawn off from the upper part of each unit, more particularly from the upper part of unit A. The movement of the thick meal suspension from unit to unit is by gravity, the head of liquid in each successive unit being less than in the preceding unit.

We claim:

1. Extraction apparatus consisting of a series of units, in horizontal arrangement side by side, each comprising a tank the lower part of which provides a mixing zone and the upper part a settling zone; agitators in said mixing zones; said mixing zones communicating one with the other through orifices at a level below the settling zones; means for feeding material by gravity into the mixing zone of the first unit of the series; means for introducing solvent into the last unit of the series to extract solubles from said material; means for discharging extract from the settling zone of each unit into the mixing zone of the next unit in advance in the direction of the first unit, said discharge being at points to maintain liquid levels progressively higher in the direction of the first unit whereby a gravity flow of the material takes place through the apparatus; and means for removing spent material from the last unit.

2. Extraction apparatus consisting of a series of units, in horizontal arrangement side by side, each comprising a tank the lower part of which provides a mixing zone and the upper part a settling zone; agitators in said mixing zones; said mixing zones communicating one with the other through orifices at a level below the settling zones; means for feeding material by gravity into the mixing zone of the first unit of the series; means for introducing solvent into the last unit of the series to extract solubles from said material; means for discharging extract from the settling zone of each unit into the mixing zone of the next unit in advance in the direction of the first unit, said discharge being at points to maintain liquid levels progressively higher in the direction of the first unit whereby a gravity flow of the material takes place through the apparatus; means for removing spent material from the last unit; and means for adjusting the liquid levels maintained in said units for the purpose of controlling the flow of the material in suspension through the apparatus.

3. Extraction process which comprises: causing a regulated gravity flow of a heavy water suspension of the material from which the extract is to be made through the bottom portions of a series of vessels, in horizontal arrangement side by side, from the bottom of one directly to the bottom of the next without passing through the upper portions of the vessels; agitating the material in the bottoms of the vessels with the liquid there above quiescent; introducing solvent into the material in the last of the series of vessels to extract solubles from said material and withdrawing extract from the upper part of the first vessel of the series; withdrawing extract from each of the vessels, beginning with the last, at points to maintain progressively higher liquid levels in the vessels in the direction toward the entering material, and introducing the extract, in each case, into the material of the next vessel in advance; and removing the material from the last of the vessels.

LLOYD C. SWALLEN.
HAROLD REINTJES.